(12) United States Patent
Shidara et al.

(10) Patent No.: US 11,701,961 B2
(45) Date of Patent: Jul. 18, 2023

(54) ASSEMBLY

(71) Applicant: DENSO CORPORATION, Kariya (JP)

(72) Inventors: Yukio Shidara, Kariya (JP); Akihiro Maeda, Kariya (JP)

(73) Assignee: DENSO CORPORATION, Kariya (JP)

(*) Notice: Subject to any disclaimer, the term of this patent is extended or adjusted under 35 U.S.C. 154(b) by 226 days.

(21) Appl. No.: 17/142,510

(22) Filed: Jan. 6, 2021

(65) Prior Publication Data

US 2021/0122230 A1 Apr. 29, 2021

Related U.S. Application Data

(63) Continuation of application No. PCT/JP2019/027265, filed on Jul. 10, 2019.

(30) Foreign Application Priority Data

Jul. 24, 2018 (JP) .................................. 2018-138291

(51) Int. Cl.
*B60K 11/00* (2006.01)
*B60K 11/04* (2006.01)

(52) U.S. Cl.
CPC .................... *B60K 11/04* (2013.01)

(58) Field of Classification Search
CPC .................... B60K 11/04; F28F 9/00
USPC ....................................................... 180/68.4
See application file for complete search history.

(56) References Cited

U.S. PATENT DOCUMENTS

| 5,271,473 A | 12/1993 | Ikeda et al. | |
|---|---|---|---|
| 5,996,684 A * | 12/1999 | Clifton | B60K 11/04 165/4 |
| 6,202,737 B1 * | 3/2001 | Mahe | B60K 11/04 165/140 |
| 6,318,450 B1 * | 11/2001 | Acre | F28F 9/002 165/149 |
| 6,705,387 B2 * | 3/2004 | Kokubunji | B60K 11/04 165/149 |
| 6,883,589 B2 * | 4/2005 | Ozawa | B60K 11/04 165/41 |

(Continued)

FOREIGN PATENT DOCUMENTS

| JP | H05170135 A | 7/1993 |
|---|---|---|
| JP | H10178276 A | 6/1998 |

(Continued)

*Primary Examiner* — Hau V Phan
(74) *Attorney, Agent, or Firm* — Harness, Dickey & Pierce, P.L.C.

(57) ABSTRACT

An assembly includes multiple structures and a first bracket. The multiple structures include at least a first structure, a second structure, and a third structure located between the first structure and the second structure. The first bracket is configured to fix the second structure to the first structure and support the third structure. The first structure, the second structure, and the third structure are arranged in a first direction. The first bracket includes a second structure supporting portion supporting the second structure and a third structure supporting portion supporting the third structure. The second structure supporting portion is located on a first side of the first bracket and the third structure supporting portion is located on a second side of the first bracket. The first side and the second side are opposite to each other in a second direction perpendicular to the first direction.

8 Claims, 14 Drawing Sheets

(56) References Cited

U.S. PATENT DOCUMENTS

| | | | | |
|---|---|---|---|---|
| 7,044,203 B2* | 5/2006 | Yagi | ........................ | F28F 9/002 |
| | | | | 165/122 |
| 7,640,966 B2* | 1/2010 | Maeda | .................... | F28F 9/002 |
| | | | | 165/41 |
| 7,703,566 B2* | 4/2010 | Wilson | ................... | B60K 11/04 |
| | | | | 180/295 |
| 7,882,913 B2* | 2/2011 | Maeda | ................... | B60K 11/04 |
| | | | | 180/68.6 |
| 7,886,860 B2* | 2/2011 | Spieth | .................. | B62D 25/084 |
| | | | | 165/47 |
| 8,936,121 B2* | 1/2015 | Vacca | .................... | B60K 11/04 |
| | | | | 165/44 |
| 9,186,980 B2* | 11/2015 | Shibutani | ................ | B60K 11/04 |
| 9,823,027 B2* | 11/2017 | Armsden | .............. | F28F 21/062 |
| 9,903,261 B2* | 2/2018 | Tanahashi | .............. | B60K 11/04 |
| 2006/0090878 A1* | 5/2006 | Levasseur | ............... | F28F 9/002 |
| | | | | 165/69 |
| 2015/0136353 A1 | 5/2015 | Niemann et al. | | |
| 2017/0282704 A1* | 10/2017 | Gassmann | ............. | B60K 11/04 |

FOREIGN PATENT DOCUMENTS

| | | |
|---|---|---|
| JP | 2000-283693 A | 10/2000 |
| JP | 2002-002312 A | 1/2002 |
| JP | 2015101333 A | 6/2015 |
| JP | 2016101787 A | 6/2016 |
| JP | 2019100389 A | 6/2019 |

* cited by examiner

FIG. 3
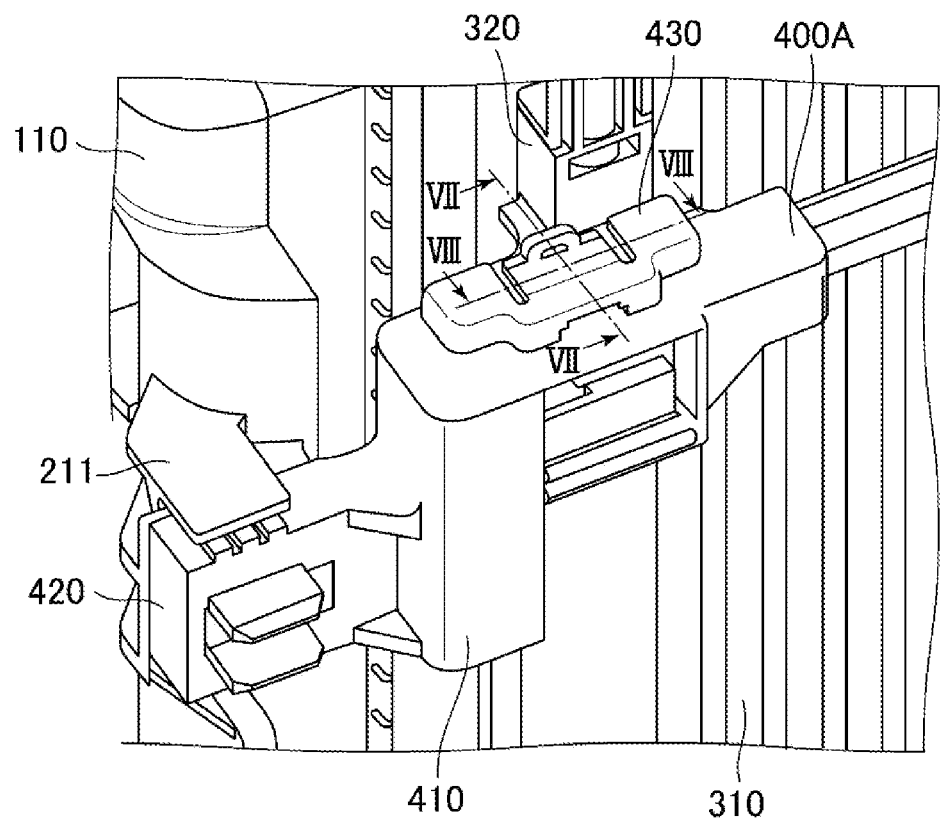
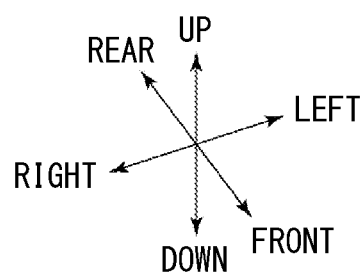

FIG. 5
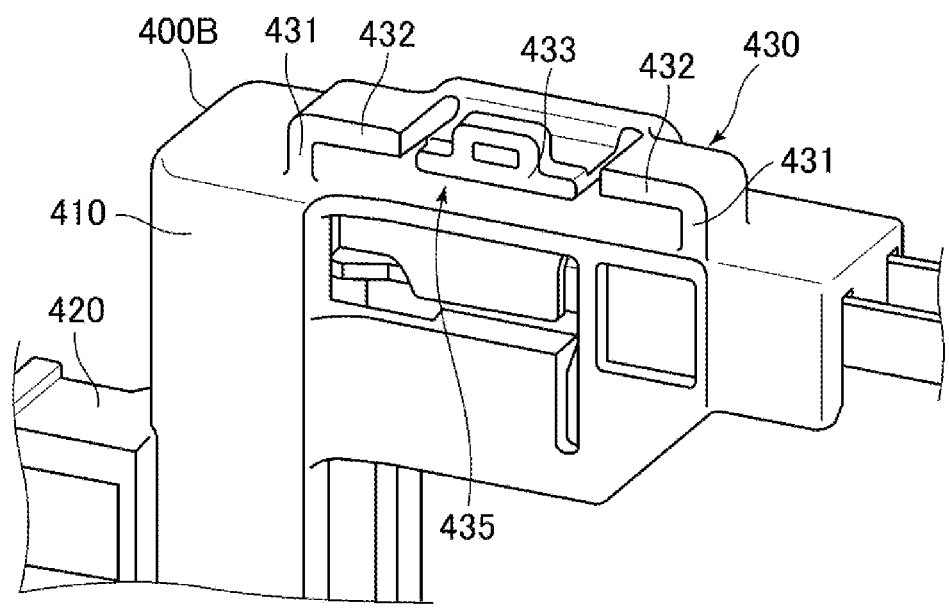
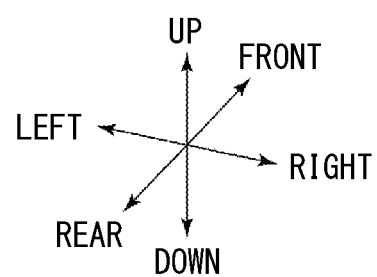

FIG. 6
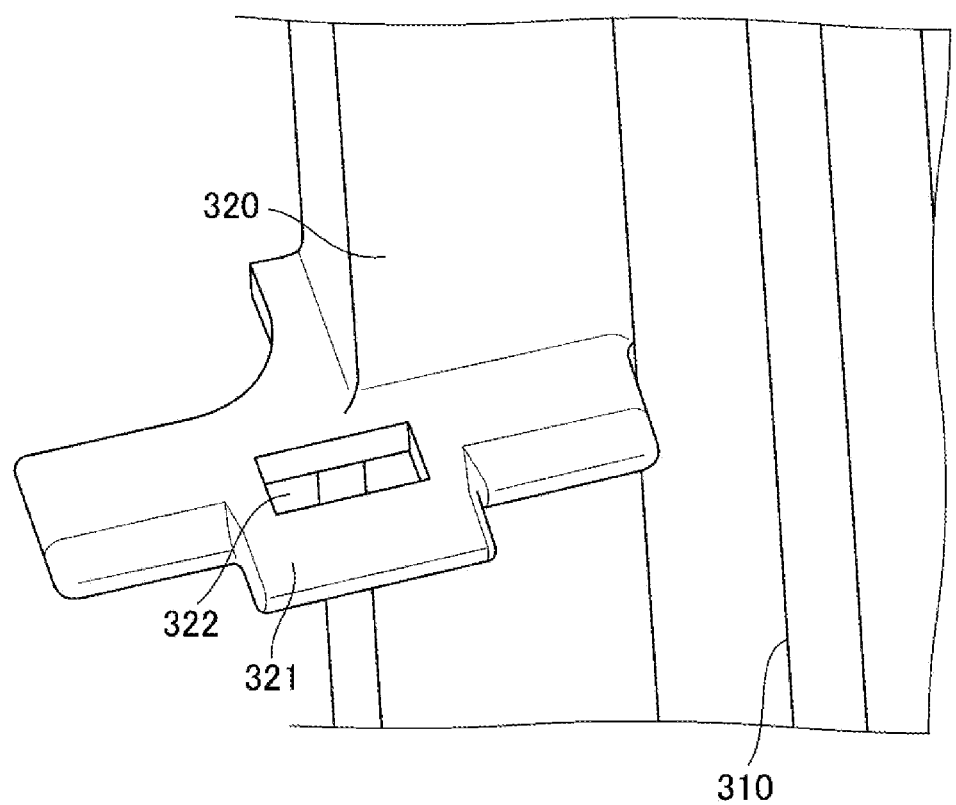
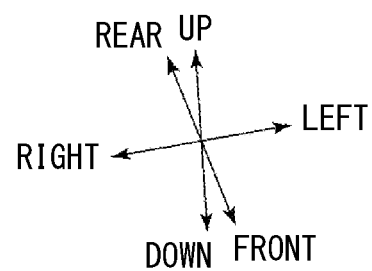

FIG. 7
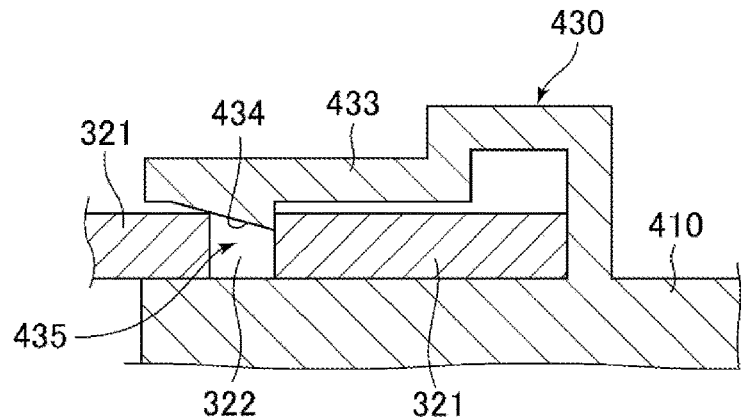
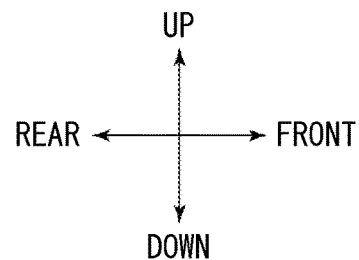
FIG. 8
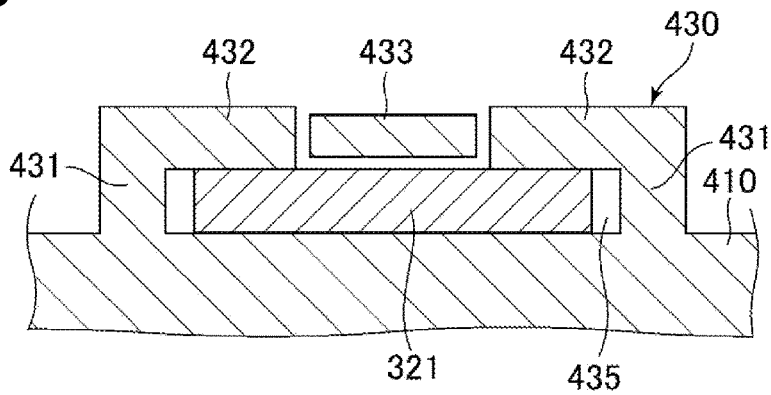
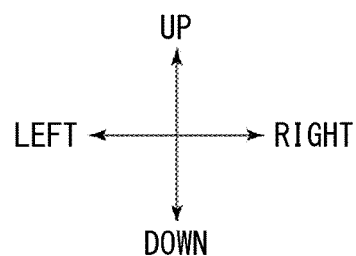

FIG. 9
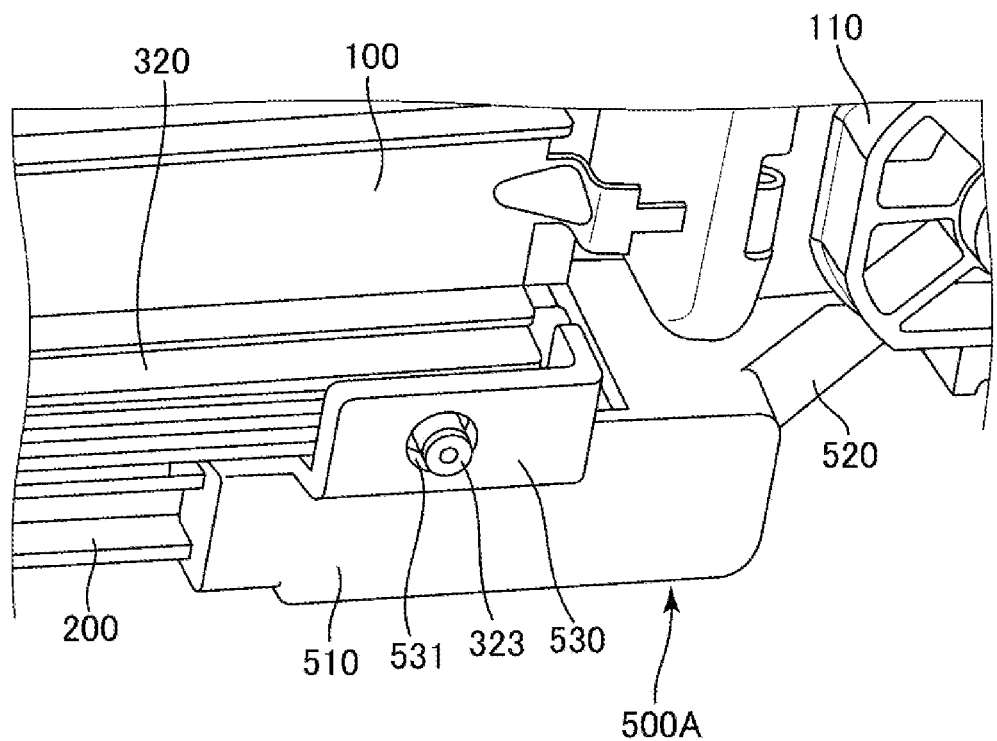
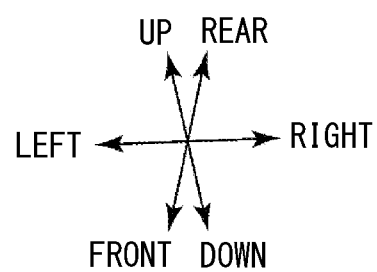

FIG. 10
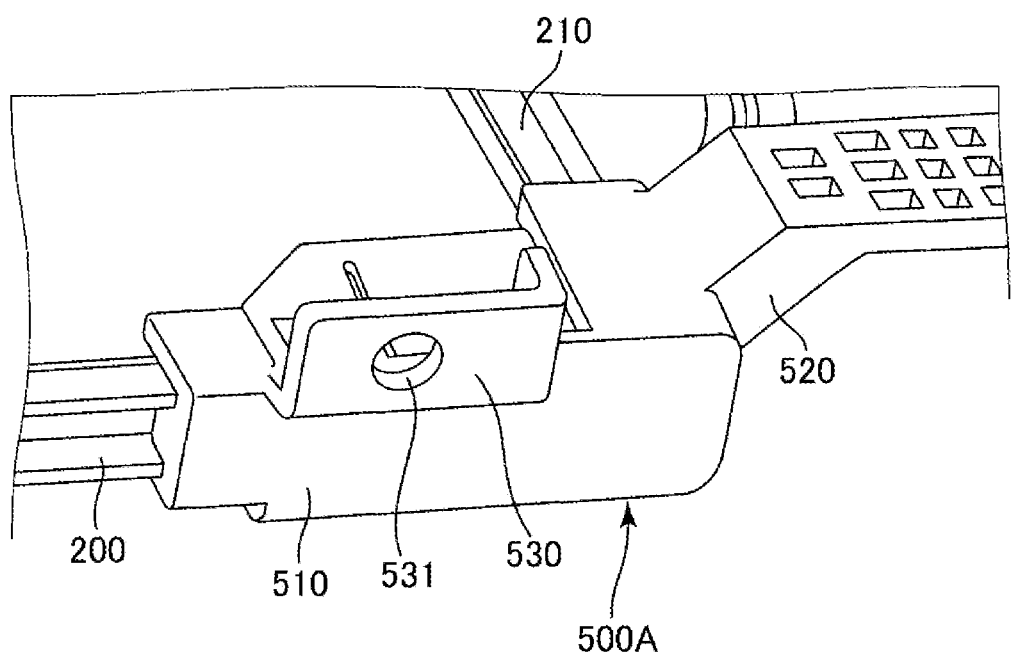
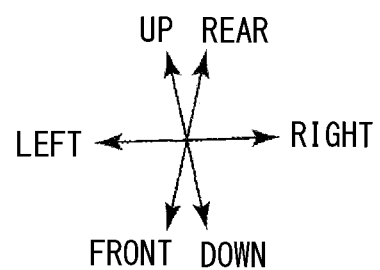

FIG. 11
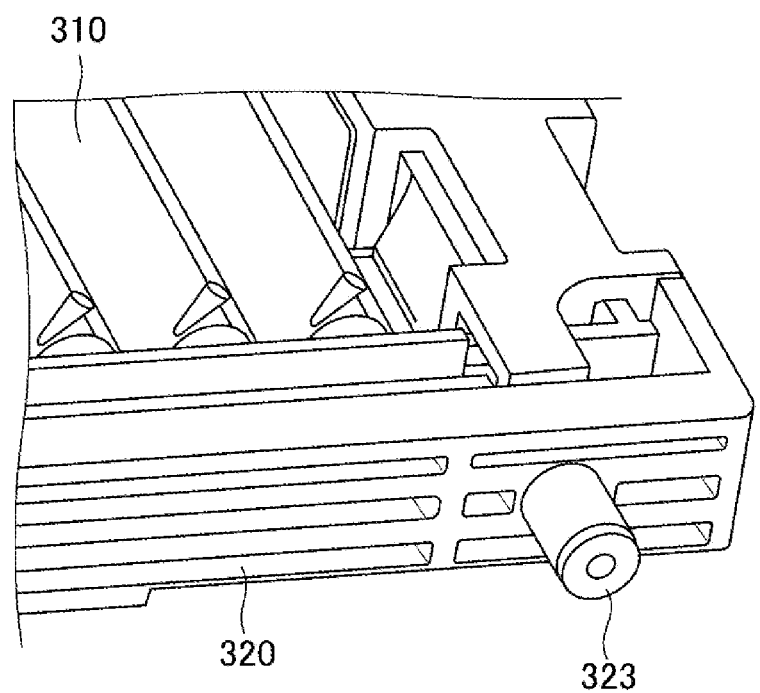
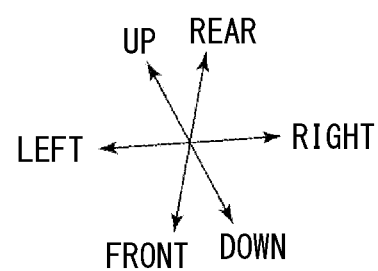

FIG. 12
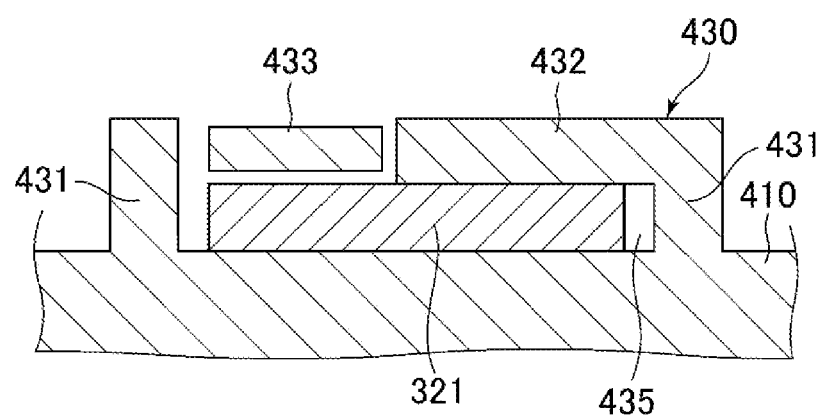
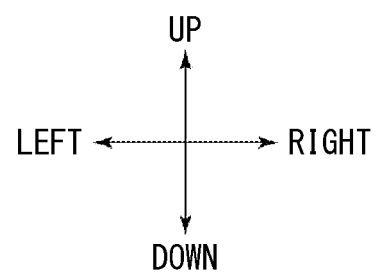

FIG. 15
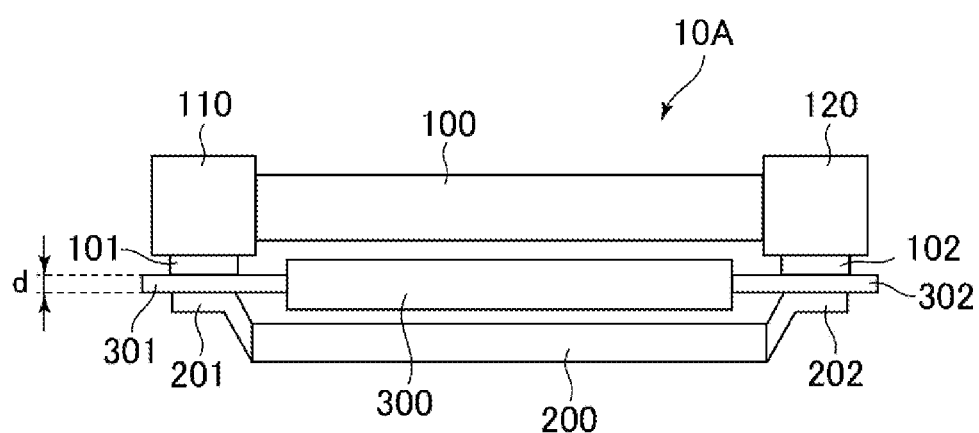
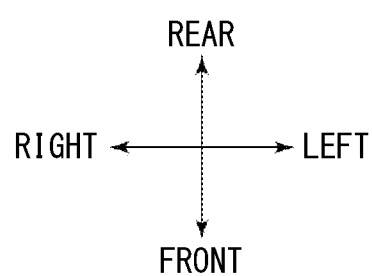

ated on Jul. 10, 2019, which designated the U.S. and claims the benefit of priority from Japanese Patent Application No. 2018-filed on Jul. 24, 2018. The entire disclosures of all of the above applications are incorporated herein by reference.

ASSEMBLY

CROSS REFERENCE TO RELATED APPLICATION

This application is a continuation application of International Patent Application No. PCT/JP2019/027265 filed on Jul. 10, 2019, which designated the U.S. and claims the benefit of priority from Japanese Patent Application No. 2018-filed on Jul. 24, 2018. The entire disclosures of all of the above applications are incorporated herein by reference.

TECHNICAL FIELD

The present disclosure relates to an assembly configured by assembling multiple structures.

BACKGROUND

A front module that is mounted in a front side of a vehicle has been known. The front module is a module into which multiple structures such as a heat exchanger and a fan are assembled. The multiple structures are arranged in a front-rear direction of the vehicle.

SUMMARY

An assembly includes multiple structures including at least a first structure, a second structure, and a third structure located between the first structure and the second structure. The multiple structures are assembled into the assembly. The assembly includes a first bracket configured to fix the second structure to the first embodiment and support the third structure. The first structure, the second structure, and the third structure are arranged in a first direction. The first bracket includes a second structure supporting portion supporting the second structure and a third structure supporting portion supporting the third structure. The second structure supporting portion is located on a first side of the first bracket and the third structure supporting portion is located on a second side of the first bracket. The first side and the second side is opposite to each other in a second direction perpendicular to the first direction.

BRIEF DESCRIPTION OF DRAWINGS

FIG. 3 is a partial enlarged view of the heat exchange module.

FIG. 5 is a diagram of a bracket attached to the condenser.

FIG. 6 is a partial enlarged view of the shutter.

FIG. 7 is a cross-sectional view taken along a line VII-VII in FIG. 3.

FIG. 8 is a cross-sectional view taken along a line VIII-VIII in FIG. 3.

FIG. 9 is a partial enlarged view of the heat exchange module.

FIG. 10 is a diagram of a bracket attached to the condenser.

FIG. 11 is a partial enlarged view of the shutter.

FIG. 12 is a cross-sectional view of a heat exchange module that is an assembly of a second embodiment.

FIG. 15 is a diagram illustrating a configuration of a heat exchange module of a comparative example.

DETAILED DESCRIPTION

Figure 1:
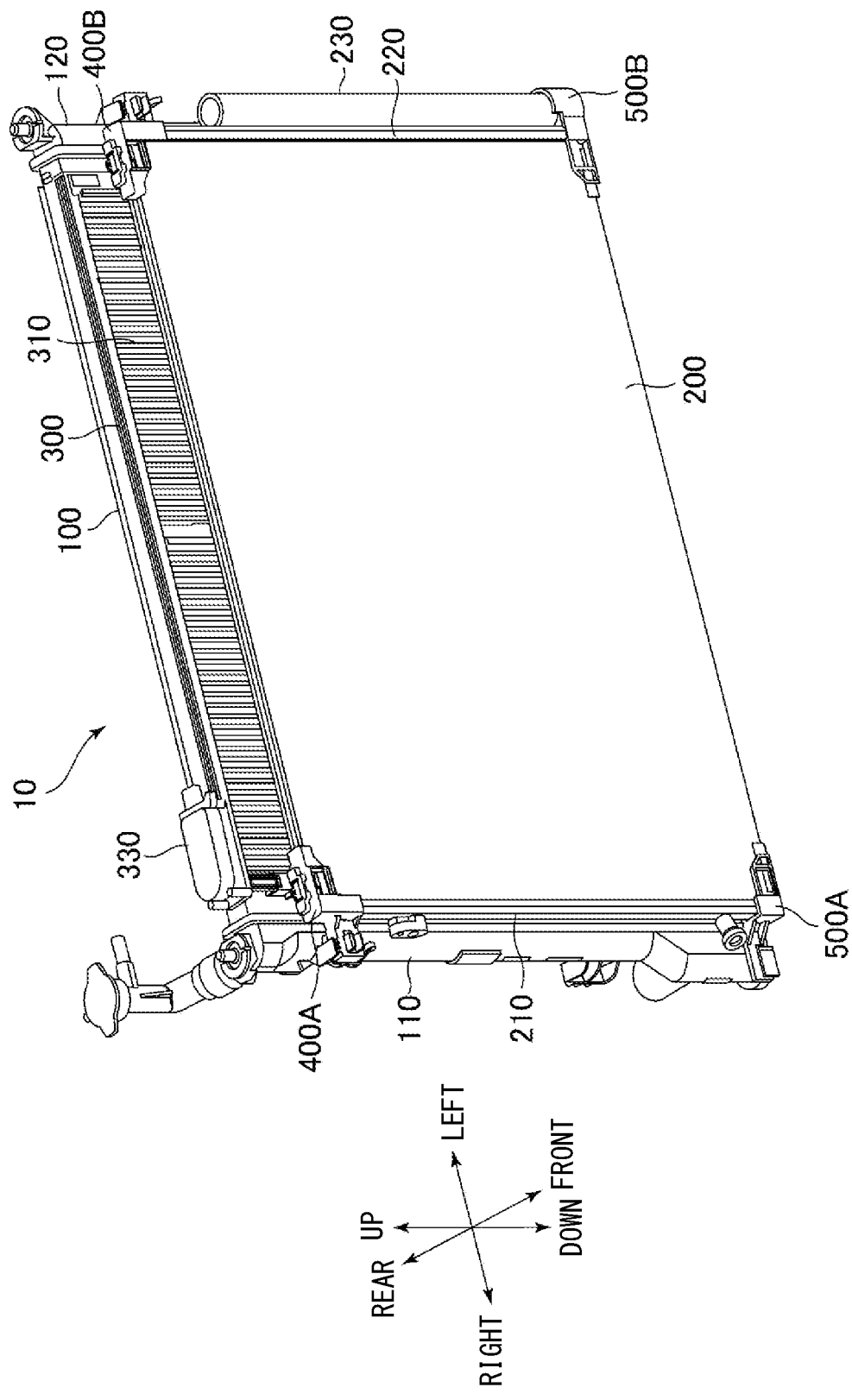
FIG. 1 is a diagram illustrating an overall structure of a heat exchange module that is an assembly of a first embodiment.

To begin with, examples of relevant techniques will be described.

A front module that is mounted in a front side of a vehicle has been known. The front module is a module into which multiple structures such as a heat exchanger and a fan are assembled. The multiple structures are arranged in a front-rear direction of the vehicle.

As he number of devices disposed in a space inside the vehicle increases, it is needed to reduce dimensions of the front module especially in the front-rear direction.

The inventors of the present disclosure study, as the front module, assembling three structures of a condenser, a shutter, and a radiator into a single assembly.

As a specific configuration for the single assembly of the three structures, for example, each of the three structures includes a fixing portion and the fixing portions are overlapped in the front-rear direction and fixed with each other.

The three structures are referred to as a front structure located in a forefront side of the structures, a rear structure located in a rearmost side of the structures, and a middle structure located between the front structure and the rear structure. In such configuration, the fixing portion of the middle structure is located between the fixing portion of the front structure and the fixing portion of the rear structure. Thus, a dimension of the assembly in the front-rear direction is increased by a thickness of the fixing portion of the middle structure.

It is objective of the present disclosure to provide an assembly to reduce a dimension in an arranging direction in which the multiple structures are arranged.

An assembly includes multiple structures including at least a first structure, a second structure, and a third structure located between the first structure and the second structure. The multiple structures are assembled into the assembly. The assembly includes a first bracket configured to fix the second structure to the first embodiment and support the third structure. The first structure, the second structure, and the third structure are arranged in a first direction. The first bracket includes a second structure supporting portion supporting the second structure and a third structure supporting portion supporting the third structure. The second structure supporting portion is located on a first side of the first bracket and the third structure supporting portion is located on a second side of the first bracket. The first side and the second side is opposite to each other in a second direction perpendicular to the first direction.

In such assembly, the third structure located between the first structure and the second structure is supported by the first bracket that is configured to fix the second structure to the first structure. In this configuration, it is not necessary to locate a part of the third structure between fixing portions of the first structure and the second structure. Thus, a dimension of the assembly can be reduced in an arranging direction in which the multiple structures are arranged (i.e., the first direction).

Such configuration of the assembly is not limited to a configuration of the front module and may be applied for configurations of various assembly.

According to the present disclosure, an assembly that can reduce a dimension of the assembly in the arranging direction is provided.

Hereinafter, the present embodiments will be described with reference to the attached drawings. In order to facilitate the ease of understanding, the same reference numerals are attached to the same constituent elements in each drawing where possible and redundant explanations are omitted.

A first embodiment will be described. An assembly in this embodiment is configured by assembling multiple structures including a radiator 100, a condenser 200, and a shutter 300 which will be described later. Specifically, the assembly is configured as a heat exchange module 10 mounted in a vehicle (not shown). The heat exchange module 10 is a device mounted in a front side of the vehicle and referred to as a "front module".

The heat exchange module 10 is configured as a single module formed by assembling the radiator 100, the condenser 200, and the shutter 300 as described above. As shown in FIG. 1, the condenser 200, the shutter 300, and the radiator 100 are arranged in this order from a front side to a rear side of the vehicle. That is, they are arranged in a first direction that is a horizontal direction. Specifically, they are arranged in a front-rear direction of the vehicle. Another structure may be assembled to the heat exchange module 10 in addition to the three structures.

The radiator 100 is a heat exchanger configured to exchange heat between an air and a cooling water. The cooling water circulates between the radiator 100 and an internal combustion engine (not shown). The cooling water having been heated by passing through the internal combustion engine and the like is cooled by exchanging heat with the air by flowing through the radiator 100. The cooling water having been cooled is supplied to the internal combustion engine and the like again and used to cool the internal combustion engine and the like. A cooling target may be an inverter or battery other than the internal combustion engine.

The radiator 100 includes a first tank 110 and a second tank 120. The first tank 110 is a container through which the cooing water flows into a heat exchange portion. The first tank 110 is located in a right side of the radiator 100 in the vehicle and extends in an up-down direction. The second tank 120 is a container through which the cooling water flows into the heat exchange portion as with the first tank 110. The second tank 120 is located in a left side of the radiator 100 in the vehicle and extends in the up-down direction. Multiple tubes extending in a right-left direction fluidly connect between the first tank 110 and the second tank 120. The multiple tubes are stacked in the up-down direction. Fins (not shown) are arranged between adjacent ones of the multiple tubes.

The cooling water supplied from an outside of the radiator 100 flows between the first tank 110 and the second tank 120 through the tubes. At this time, heat exchange is performed between the cooling water flowing through the tubes and the air flowing outside of the tubes. The air is introduced through a front grill of the vehicle that is located in a front side of the vehicle. The air is blown from the front side to the rear side of the vehicle by a fan (not shown). The air having passed through the condenser 200 and the shutter 300 which will be described later passes through the radiator 100. The radiator 100 including the multiple tubes and fins may be a known one, thus concrete description and illustration thereof will be omitted. The radiator 100 corresponds to "a first structure" in this embodiment.

The condenser 200 is a heat exchanger configured to exchange heat between the air and a refrigerant. The condenser 200 is configured as a part of a refrigeration cycle constituting an air conditioner (not shown). In the condenser 200, the refrigerant releases heat to the air.

The condenser 200 includes a first tank 210, a second tank 220, and a gas-liquid separator 230. The first tank 210 is a container to store the refrigerant temporarily. The first tank 210 is located in a right side of the condenser 200 in the vehicle and extends in the up-down direction. The second tank 220, as with the first tank 210, is a container to store the refrigerant temporarily. The second tank 220 is located in a left side of the condenser 200 in the vehicle and extends in the up-down direction. The gas-liquid separator 230 is a container to separate a gas-liquid phase of the refrigerant passing through the condenser 200.

Multiple tubes (not shown) extending in the right-left direction fluidly connect between the first tank 210 and the second tank 220. The multiple tubes are stacked in the up-down direction. Fins (not shown) are arranged between adjacent ones of the multiple tubes.

The refrigerant supplied from an outside of the condenser 200 flows between the first tank 210 and the second tank 220 through the multiple tubes. At this time, a heat exchange is performed between the refrigerant flowing through the tubes and the air flowing outside of the tubes. Inside the tubes, the refrigerant released its heat to the air and converted into the liquid phase from the gas phase. The air flows from the front side to the rear side of the vehicle as described above.

The refrigerant having been cooled by the air is separated into the gas phase and the liquid phase when passing through the gas-liquid separator 230. The liquid-phase refrigerant further flows toward a downstream side of the condenser 200. The refrigerant flowing out of the gas-liquid separator 230 may flow a part of the condenser 200, specifically a subcooling portion, to be further cooled. The configuration of the condenser 200 may be a known one, thus a concrete description and illustration thereof will be omitted. The condenser 200 corresponds to "a second structure" in this embodiment.

The shutter 300 is a device to adjust an amount of air passing through the radiator 100 and the condenser 200. The shutter 300 includes blades 310 and a frame 320.

The shutter 300 includes multiple blades 310. Each of the blades 300 is an elongated plate member extending in the up-down direction. The blades 310 are arranged in the right-left direction of the vehicle and supported by the frame 320 which will be described later. Each of the blades 310 is rotatably supported around a rotational axis extending in the up-down direction. The blades 310 can switch between an opening state in which the blades 310 define gaps between adjacent ones of the blades 310 and a closing state in which ends of the blades 310 are in contact with each other to close the gaps by rotating as described above.

Such operation of the blades 310 are performed by a driving device 330 located on an upper portion of the frame 320 and a power transmission mechanism, which are not shown. In the opening state, the air passes through the heat exchange module 10. Thereby, the heat exchanges are performed in the radiator 100 and the condenser 200. In contrast, in the closing state, the airflow passing through the heat exchange module 10 is blocked by the shutter 300. Thus, the heat exchange is performed in neither the radiator 100 nor the condenser 200.

Figure 4:
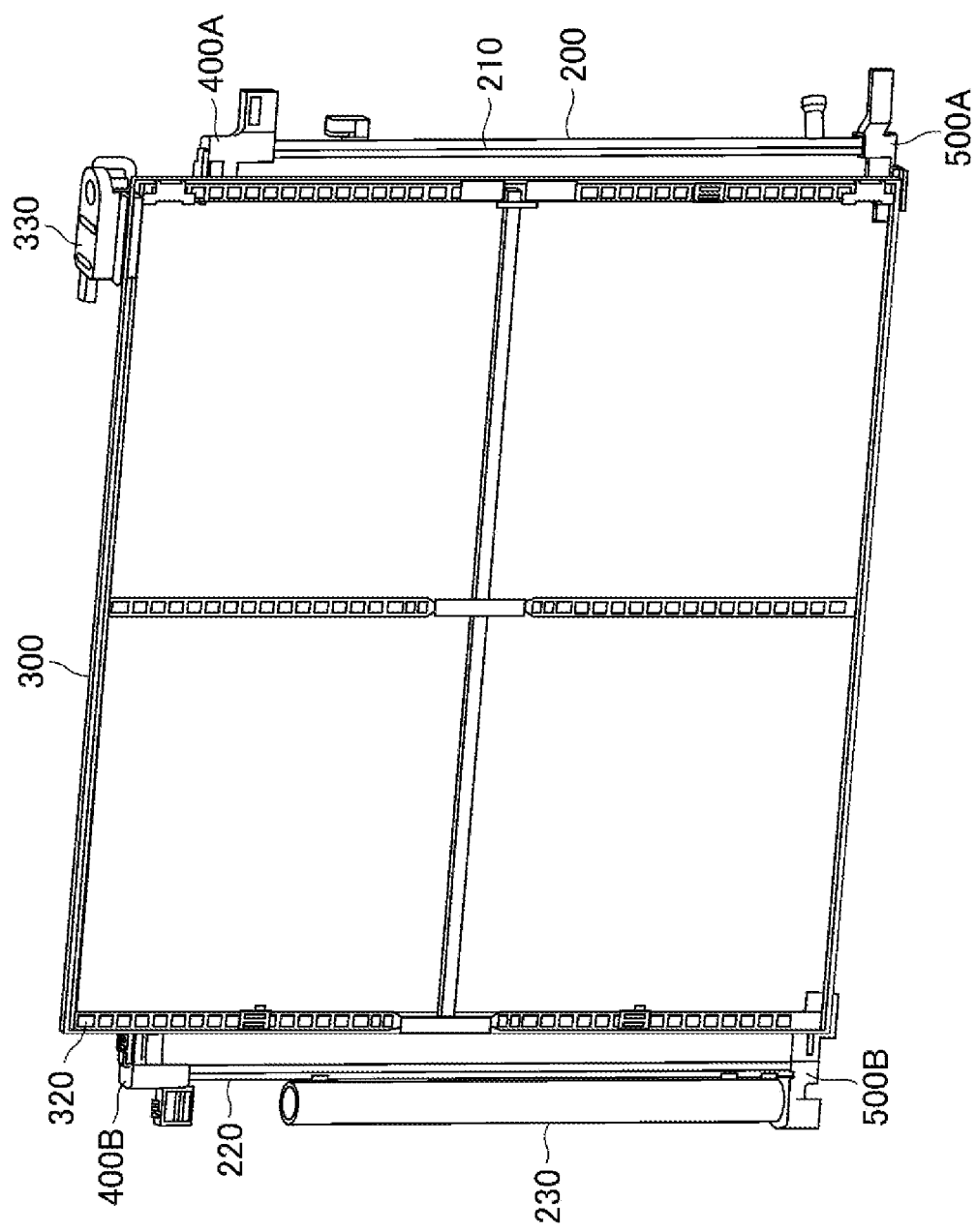
FIG. 4 is a diagram illustrating a state in which a shutter is attached to the condenser.

As shown in FIG. 4, the frame 320 is a frame having a rectangular shape as a whole. The blades 310 (not shown in FIG. 4) are rotatably supported inside the frame 320. In this embodiment, the blades 310 are arranged in two rows. Each group of the blades 310 is supported by an upper portion and a lower portion of the frame 320. The configuration of the shutter 300 including the blades 310 and the frame 320 may be a known one, thus detailed description and illustration thereof will be omitted. The shutter 300 corresponds to "a third structure" in this embodiment.

Figure 2:
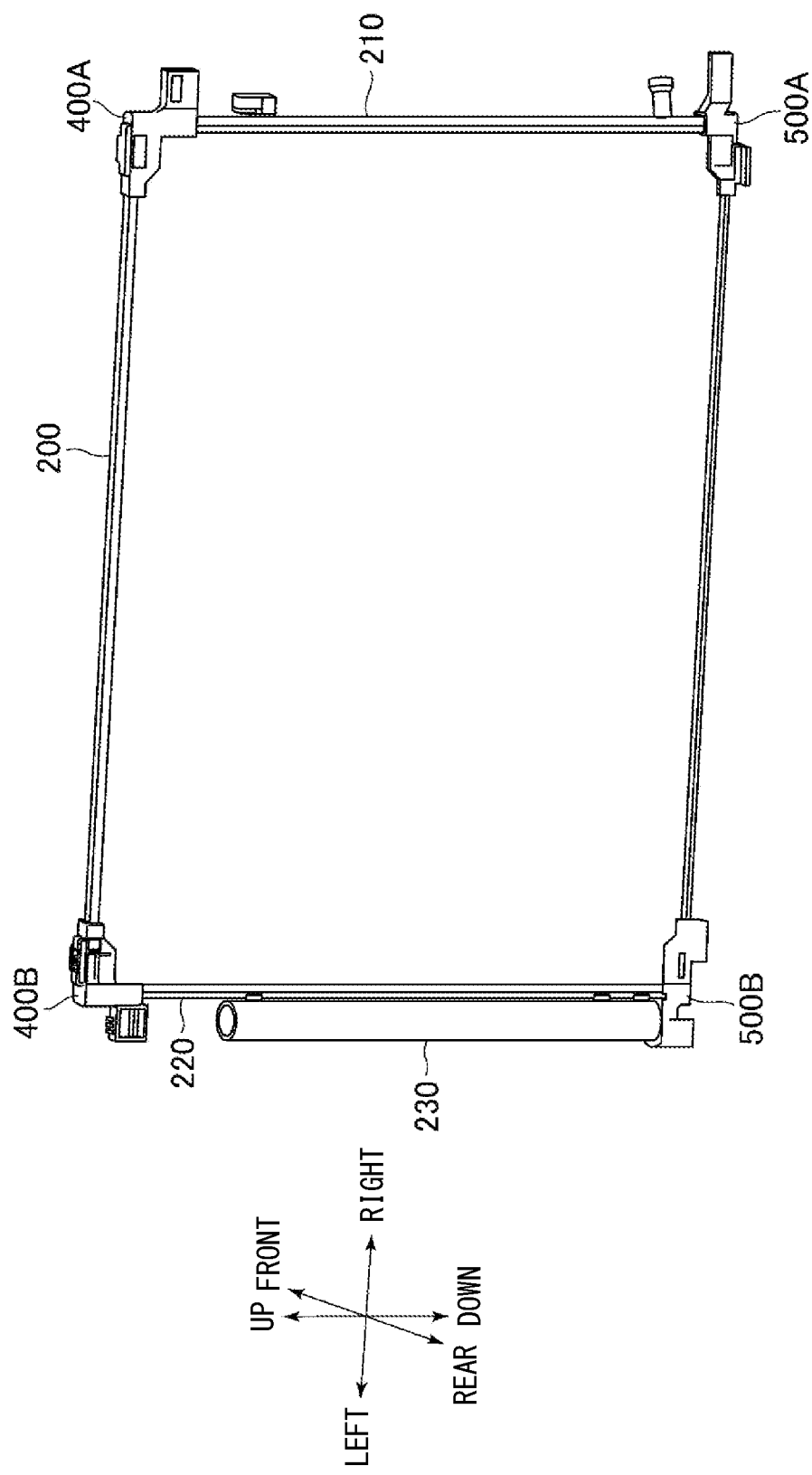
FIG. 2 is a diagram illustrating an overall structure of a condenser of the heat exchange module.

A configuration to assemble the radiator 100, the condenser 200, and the shutter 300 into a single module will be described. In FIG. 2, an overall configuration of the condenser 200 to which the radiator 100 is not attached is illustrated. As shown in the same figure, four brackets 400A, 400B, 500A, and 500B are attached to the condenser 200. The four brackets are made of a resin. The brackets 400A, 400B, 500A, and 500B are used to fix the condenser 200 (i.e., the second structure) to the radiator 100 (i.e., the first structure).

The bracket 400A is attached to an upper right edge of the condenser 200 to support the condenser 200. The bracket 400B is attached to an upper left edge of the condenser 200 to support the condenser 200. The bracket 500A is attached to a lower right edge of the condenser 200 to support the condenser 200. The bracket 500B is attached to a lower left edge of the condenser 200 to support the condenser 200.

FIG. 3 is an enlarged view of a configuration of the bracket 400A located in an upper right portion of the heat exchange module 10 and peripheral configurations that are shown in FIG. 1. As shown in FIG. 3, the bracket 400A includes a body portion 410, a fixing portion 420, and a first receiving portion 430.

The body portion 410 occupies most parts of the bracket 400A and supports the upper right edge of the condenser 200. That is, the body portion 410 supports the condenser 200 by being attached to a part of the condenser 200. In this embodiment, the bracket 400A corresponds to a first bracket and the body portion 410 corresponds to a second structure supporting portion supporting the condenser (i.e., the second structure).

The fixing portion 420 protrudes rightward from a right surface of the body portion 410. The fixing portion 420 defines a through hole passing through the fixing portion in the front-rear direction of the vehicle. The first tank 110 of the radiator 100 has a protrusion 211 and the protrusion is inserted into the through hole. The protrusion 211 protrudes from the first tank 110 toward the front side of the vehicle and includes a tab at a tip end to prevent the protrusion 211 from slipping out. Thus, when the protrusion 211 is inserted into the through hole of the fixing portion 420 as shown in FIG. 3, the bracket 400A is fixed to the first tank 110. As a result, the condenser 200 and the radiator 100 are fixed to each other with the bracket 400A.

Each of the brackets 400B, 500A, and 500B includes a fixing portion configured similarly to the fixing portion 420 and is fixed to the radiator 100 with the fixing portion. As described above, the brackets 400A, 400B, 500A, and 500B are provided to fix the radiator 100 (i.e., the first structure) to the condenser 200 (i.e., the second structure).

The first receiving portion 430 protrudes upward from an upper surface of the body portion 410. The first receiving portion 430 is a portion to which a part of the shutter 300 is attached, as will be described later, and supports the shutter 300. In this embodiment, the first receiving portion 430 corresponds to a third structure supporting portion that supports the shutter 300 (i.e., the third structure). The second structure supporting portion (i.e., a part of the body portion 410) is located on a first side of the bracket 400A and the third structure supporting portion (i.e., the first receiving portion 430) is located on a second side of the bracket 400A. The first side and the second side are opposite to each other in a second direction perpendicular to the first direction. That is, the second structure is supported by a lower surface of the body portion 410 and the third structure is supported by an upper surface of the body portion 410.

In FIG. 4, a state in which the radiator 100 is detached from the heat exchange module 10 is illustrated. As shown in FIG. 4, when viewed from a rear side of the heat exchange module 10, an upper portion of the frame 320 of the shutter 300 overlaps with the bracket 400A. The first receiving portion 430 supports the frame 320 at the overlapping portion.

With reference to FIG. 5, a specific configuration of the first receiving portion 430 will be described. FIG. 5 is an enlarged view of the bracket 400B instead of the bracket 400A. In this embodiment, the bracket 400A and the bracket 400B are substantially symmetrical with each other, thus the configuration of the first receiving portion 430 formed in the bracket 400A will be described with reference to FIG. 5. As shown in FIG. 5, the first receiving portion 430 includes two side walls 431, a top wall 432, and a hook 433.

The two side walls 431 protrude upward from the upper surface of the body portion 410. The first receiving portion 430 includes the two side walls 431 arranged in the right-left direction of the vehicle. Each of the side walls 431 has a flat plate shape. Main surfaces of the side walls 431 face with each other in the right-left direction.

The top wall 432 connects between the upper ends of the side walls 431. The top wall 432 is substantially parallel to the upper surface of the body portion 410. The body portion 410, the two side walls 431, and the top wall 432 define a space 435 surrounded therebetween and a first protrusion 321 (see FIG. 6) which will be described later is inserted into the space 435.

The top wall 432 defines two notches extending from a rear end of the top wall 432 toward a front side of the top wall 432. The hook 433 is a part defined between the two notches of the top wall 432. In this embodiment, the hook 433 is formed in a center of the top wall 432 in the right-left direction. The hook 433 includes a tab 434 (not shown in FIG. 5 and see FIG. 7) protruding downward at a lower surface of the hook 433.

In FIG. 6, the overlapping part of the frame 320 of the shutter 300 with the bracket 400A in FIG. 4 is illustrated. As shown in FIG. 6, the frame 320 includes the first protrusion 321 at a part of the frame 320 extending in the up-down direction.

The first protrusion 321 protrudes from the frame 320 toward the front side of the vehicle (i.e., toward the bracket 400A). As shown in FIG. 6, the first protrusion 321 has a flat plate shape extending in the horizontal plane. The first protrusion 321 defines an opening 322 passing through the first protrusion 321 in the up-down direction. For example, the opening 322 has a rectangular shape.

In the state shown in FIGS. 1 and 3, the first protrusion 321 of the frame 320 is inserted into the space 435 of the bracket 400A from a rear side of the bracket 400A, thereby fixing the first protrusion 321 to the bracket 400A. FIG. 7 is a cross-sectional view taken along a line VII-VII in FIG. 3 and FIG. 8 is a cross-sectional view taken along a line VIII-VIII in FIG. 3.

As shown in FIG. 7, when the first protrusion 321 is inserted into the space 435, the tab 434 of the hook 433 enters into the opening 322 of the first protrusion 321 from an upper side of the opening 322. This restricts the first protrusion 321 from slipping out of the space 435.

As shown in FIG. 8, the top wall 432 is in contact with an upper surface of the first protrusion 321. Thus, the top wall 432 restricts the frame 320 from moving in the up-down direction.

In contrast, the hook 433 is not contact with the upper surface of the first protrusion 321 and a small gap is defined therebetween. Thus, if vibrations in the up-down direction occur in the vehicle, it is possible to prevent a situation in which the vibrations repeatedly deform a root of the hook 433 and deteriorate the root.

As described above, the upper part of the shutter 300 that is the third structure is supported by the brackets 400A and 400B. "The upper part" is "a first side" in the second direction perpendicular to the first direction, that is, specifically in the up-down direction.

A configuration of the bracket 500A will be described. As shown in FIG. 4, when viewed from the rear side of the heat exchange module 10, a lower part of the frame 320 of the shutter 300 overlaps with the bracket 500A. FIG. 9 is a bottom view of the bracket 500A and peripheral parts of the heat exchange module 10 shown in FIG. 1. FIG. 10 is a diagram illustrating a configuration of the bracket 500A to which the shutter 300 is not attached and peripheral parts. FIG. 11 is a diagram illustrating a configuration of an overlapping part of the frame 320 with the bracket 500A.

As shown in FIGS. 9 and 10, the bracket 500A includes a body portion 510, a fixing portion 520, and a second receiving portion 530.

The body portion 510 occupies most of the bracket 500A and supports the lower right edge of the condenser 200. That is, the body portion 510 is attached to a part of the condenser 200 to support the condenser 200.

The fixing portion 520 protrudes rightward from a right side surface of the body portion 410. Similarly to the fixing portion 420 of the bracket 400A described above, the fixing portion 520 is fixed to the first tank 110 of the radiator 100. A configuration to fix the bracket 500A to the radiator 100 is similar to the configuration to fix the bracket 400A to the radiator 100. Thus, specific illustration and description thereof will be omitted.

The second receiving portion 530 protrudes from the body portion 510 rearward of the vehicle (i.e., toward the shutter 300). As shown in FIG. 9, the second receiving portion 530 has a flat plate shape extending in the horizontal plane. The second receiving portion 530 defines an opening 531 passing through the second receiving portion 530 in the up-down direction. The second receiving portion 530 has a circular shape.

As shown in FIG. 11, the frame 320 includes a second protrusion 323 at the lower part extending in the right-left direction. The second protrusion 323 has a substantial circular shape and protrudes from the lower surface of the frame 320 toward the lower side of the frame 320 such that a center axis of the second protrusion 323 extends along the up-down direction. The second protrusion 323 is formed at a right side of the frame 320.

In the state shown in FIGS. 1 and 9, the second protrusion 323 of the frame 320 is inserted into the opening 531 of the bracket 500A from an upper side of the opening 531. Thus, the bracket 500A supports the frame 320. The second protrusion 323 is inserted into the opening 531, so that the frame 320 is restricted from moving in the horizontal plane.

As shown in FIG. 4, when viewed from the rear side of the heat exchange module 10 of the vehicle, the lower part of the frame 320 of the shutter 300 is also overlapped with the bracket 500B. Also in the overlapping portion of the frame 320 with the bracket 500B, the second protrusion 323 and the opening 531 are formed in the similar way described above and the second protrusion 323 is inserted into the opening 531 of the bracket 500B and supported by the bracket 500B. The bracket 500B includes the fixing portion 520 similar to that in FIG. 9 and the fixing portion 520 is fixed to the radiator 100.

As described above, the brackets 500A and 500B support the lower part of the shutter 300 that is the third structure. "The lower part" is "a second part" that is an opposite side of the first side in the up-down direction. In this embodiment, each of the brackets 500A and 500B corresponds to a second bracket.

In step of fixing the shutter 300 to the condenser 200, the brackets 400A, 400B, 500A, and 500B are firstly attached to the four edges of the condenser 200. After that, the shutter 300 and the condenser 200 are arranged to face with each other in the front-rear direction of the vehicle and the shutter 300 is tilted such that the lower end of the shutter 300 approaches to the condenser 200.

Next, the second protrusions 323 of the shutter 300 are respectively inserted into the openings 531 of the brackets 500A and 500B from an upper side of the openings 531.

Then, the tilted shutter 300 as described above is raised about the second protrusions 323 as fulcrum points and the upper end of the shutter 300 approaches to the condenser 200. Finally, the first protrusions 321 formed in the frame 320 are inserted respectively into the spaces 435 defined in the brackets 400A and 400B. Thereby, four points of the shutter 300 are respectively supported by brackets 400A, 400B, 500A, and 500B. As described above, in the configuration of this embodiment, the shutter 300 can be easily attached to the condenser 200.

As described above, the shutter 300 disposed between the radiator 100 and the condenser 200 is not directly supported by the radiator 100 and the condenser 200. The four brackets 400A, 400B, 500A, and 500B directly support the shutter 300. In order to explain advantages of this configuration, a comparative example shown in FIG. 15 will be described.

A heat exchange unit 10A in the comparative example includes the radiator 100, the condenser 200, and the shutter 300, similarly to this embodiment. The comparative example is different from this embodiment at a configuration to assemble the three structures to form a single unit.

In the comparative example, the first tank 110 of the radiator 100 includes a fixing portion 101 protruding forward. Similarly, the second tank 120 of the radiator 100 includes a fixing portion 102 that protruding forward.

The condenser 200 has a right end having a fixing portion 201 protruding rightward. Similarly, the condenser 200 has a left end having a fixing portion 202 protruding leftward.

The shutter 300 has a right end having a fixing portion 301 protruding rightward. Similarly, the shutter 300 has a left end having a fixing portion 302 protruding leftward.

In the comparative example, the fixing portions 101, 201, and 301 are overlapped with each other in the front-rear direction of the vehicle and a fastening member (not shown) passing through the fixing portions 101, 201, and 301 fasten and fix them. Similarly, the fixing portion 102, 202, and 302 are overlapped with each other in the front-rear direction of the vehicle and a fastening member (not shown) passing through the fixing portions 102, 202, and 302 fasten and fix them.

In such configuration, the condenser 200 is disposed in the most front side of the vehicle, the radiator 100 is disposed in the most rear side of the vehicle, and the shutter 300 is disposed between the condenser 200 and the radiator 100. The fixing portion 301 (or 302) of the shutter 300 is located between the fixing portion 201 (or 202) of the condenser 200 and the fixing portion 101 (or 102) of the radiator 100. Thus, a dimension of the heat exchange module 10A in the front-rear direction is increased by a thickness d of the fixing portion 301 (or 302) that is disposed between the fixing portions 101 and 201 (or 102 and 202).

In contrast, in this embodiment, the shutter 300 disposed between the radiator 100 and the condenser 200 is directly supported by the four brackets 400A, 400B, 500A, and 500B as described above. In such configuration, it is not necessary to dispose a part of the shutter 300 between the fixing portions of the radiator 100 and the condenser 200. Thus, the dimension of the heat exchange module 10 in the front-rear direction can be reduced compared to that of the comparative example shown in FIG. 15.

In the upper portion of the shutter 300 that is the third structure, the first protrusions 321 protruding from the shutter 300 in the front-rear direction are inserted into the first receiving portions 430 formed in the brackets 400A and 400B in the first direction along the front-rear direction. Thereby, the upper portion of the shutter 300 is supported.

Contrary to the above, each of the brackets 400A and 400B may have the first protrusion 321 and the frame 320 may have the first receiving portion 430. In this case, the first protrusion 321 corresponds to the third structure supporting portion.

In the lower portion of the shutter 300 that is the third structure, the second protrusions 323 protruding from the shutter 300 in the up-down direction are inserted into the second receiving portions 530 formed in the brackets 500A and 500B in the up-down direction. Thus, the lower portion of the shutter 300 is supported.

Contrary to the above, each of the brackets 500A and 500B may have the second protrusion 323 and the frame 320 may have the second receiving portion 530.

Such attachment configuration between the shutter 300 and the condenser 200 makes it possible to attach the shutter 300 easily to the condenser 200 with the above-described method.

The first protrusion 321 has a flat plate shape extending along the horizontal plane. Thus, dimensions in the up-down direction of the first protrusion 321 and the first receiving portion 430 that receives the first protrusion 321 are reduced compared to those of the case that the first protrusion 321 has a cylindrical pillar shape.

A second embodiment will be described with reference to FIG. 12. In this embodiment, the first receiving portions 430 formed in the brackets 400A and 400B are different from those of the first embodiment.

FIG. 12 is a cross-sectional view in the same view point of FIG. 8 that illustrates the shape of the first receiving portion 430. In this embodiment, as shown in FIG. 12, the hook 433 is not formed in the center of the top wall 432 in the right-left direction. The hook 433 is formed in a right side or left side of the first receiving portion 430 that is outside of the top wall 432. Also in this embodiment, the similar advantages to those described in the first embodiment can be obtained.

Figure 13:
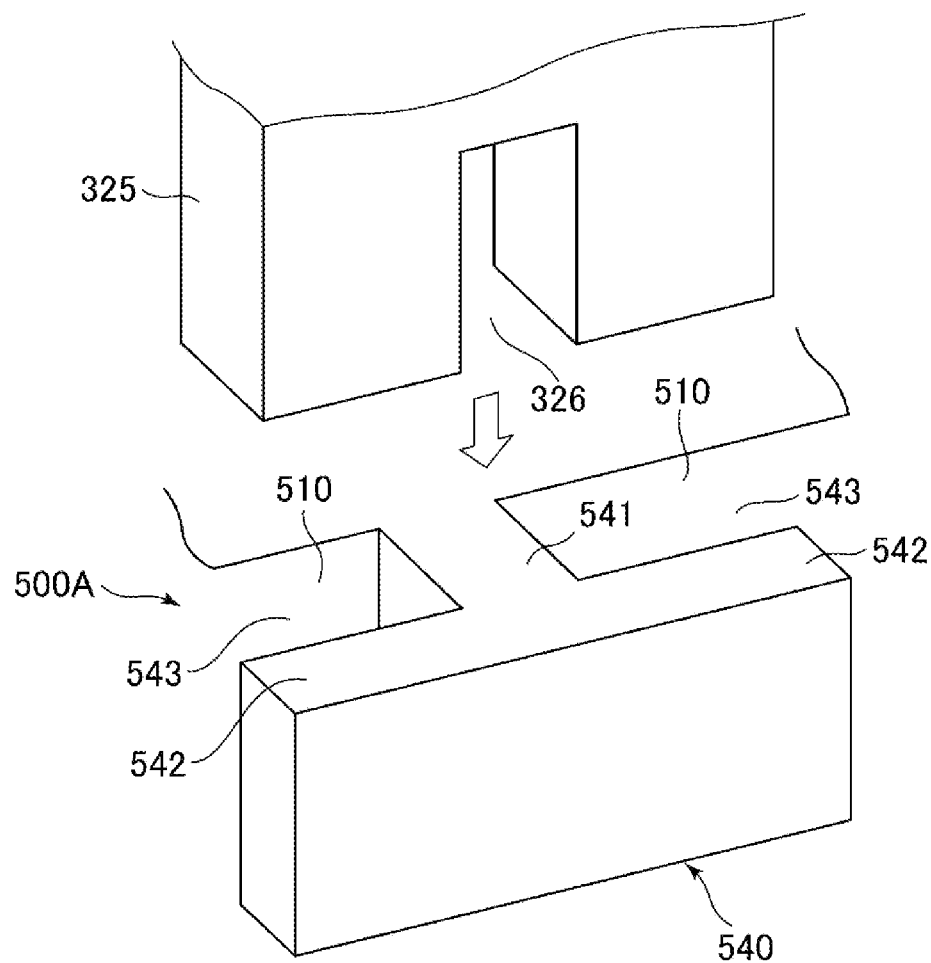
FIG. 13 is a diagram illustrating a configuration of a heat exchange module that is an assembly of a third embodiment.

A third embodiment will be described with reference to FIG. 13. The third embodiment is different from the first embodiment at shapes of the second protrusion and the second receiving portion that receives the second protrusion.

In this embodiment, the frame 320 includes a second protrusion 325 in place of the second protrusion 323 in the first embodiment. The bracket 500A includes a second receiving portion 540 in place of the second receiving portion 530 in the first embodiment.

The second protrusion 325 has a plate shape and a normal line of a main surface thereof extends along the front-rear direction of the vehicle. The second protrusion 325 protrudes downward in the up-down direction from a lower end of the frame 320. The second protrusion 325 has a recess 326 recessed from a center of a lower end of the second protrusion 325 in the up-down direction.

The second receiving portion 540 includes a protrusion 541 and an enlarged portion 542. The protrusion 541 protrudes rearward from the body portion 510 of the bracket 500A. The protrusion 541 has a plate shape. The enlarged portion 542 extends rightward and leftward from a rear end of the protrusion 541 in the right-left direction of the vehicle. The enlarged portion 542 has a plate shape. There are gaps 543 between the enlarged portion 542 and the body portion 510.

When the shutter 300 is attached to the condenser 200, the recess 326 is arranged at a position directly above the protrusion 541 and then the shutter 300 is moved downward as shown in an arrow. Eventually, the protrusion 541 is fit into the recess 326 and the second protrusion 325 is fit into the gaps 543. Thereby, the bracket 500A supports the shutter 300 and the frame 320 is restricted from moving along the horizontal plane. The bracket 500B has the similar configuration to that described above. Also in this embodiment, the similar advantages to those described in the first embodiment are obtained.

Figure 14:
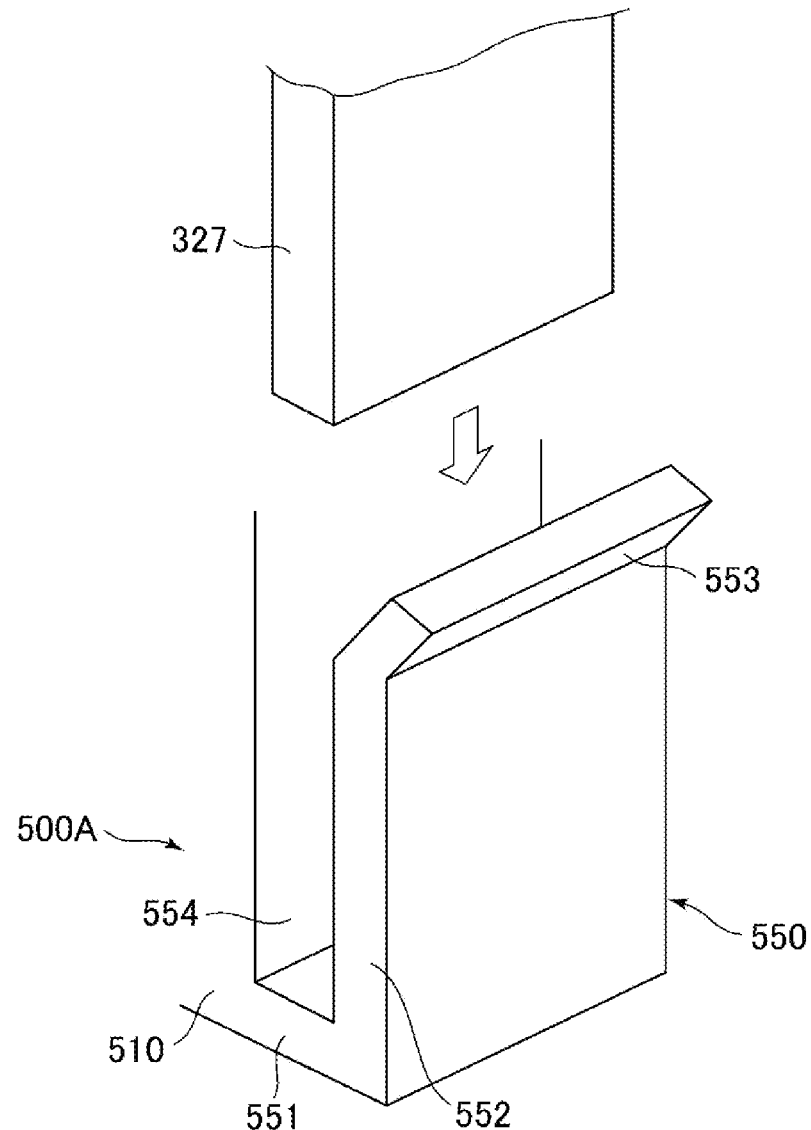
FIG. 14 is a diagram illustrating a configuration of a heat exchange module that is an assembly of a fourth embodiment.

A fourth embodiment will be described with reference to FIG. 14. The fourth embodiment is different from the first embodiment at shapes of the second protrusion and the second receiving portion that receives the second protrusion.

In this embodiment, the frame 320 has a second protrusion 327 in place of the second protrusion 323 in the first embodiment. The bracket 500A has a second receiving portion 550 in place of the second receiving portion 530 in the first embodiment.

The second protrusion 327 has a plate shape and a normal line of a main surface thereof extends along the front-rear direction of the vehicle. The second protrusion 327 protrudes downward in the up-down direction from the lower end of the frame 320.

The second receiving portion 550 includes a protrusion 551 and a guide portion 552. The protrusion 551 protrudes rearward from the body portion 510 of the bracket 500A. The protrusion 551 has a plate shape. The guide portion 552 extends upward from a rear end of the protrusion 551 and has a plate shape. There is a gap 554 between the body portion 510 and the guide portion 552. The guide portion 552 has a tilted portion 553 at an upper portion of the guide portion 552. The tilted portion 553 is tilted such that a width of the gap 554 increases in a direction upward. "The width" is a dimension in the front-rear direction.

When the shutter 300 is attached to the condenser 200, the second protrusion 327 is arranged at a position directly above the gap 554 and then the shutter 300 is moved downward as shown in an arrow. Eventually, a lower part of the second protrusion 327 enters into the gap 554. Thereby, the bracket 500A supports the shutter 300 and the frame 320 is restricted from moving in the front-rear direction. The bracket 500B has the similar configuration to that described above. Also in this embodiment, the similar advantages to those described in the first embodiment can be obtained.

Only either one of the bracket 500A and the bracket 500B may have the configuration in this embodiment and the other one may have the configuration in the first embodiment.

The present embodiments have been described above with reference to concrete examples. However, the present disclosure is not limited to those specific examples. Those specific examples that are appropriately modified in design by those skilled in the art are also encompassed in the scope of the present disclosure, as far as the modified specific examples have the features of the present disclosure. Each element included in each of the specific examples described above and the arrangement, condition, shape, and the like thereof are not limited to those illustrated, and can be changed as appropriate. The combinations of elements included in each of the above described specific examples can be appropriately modified as long as no technical inconsistency occurs.

What is claimed is:

1. A vehicle radiator assembly comprising:
   a plurality of structures including at least a radiator, a condenser, and a shutter located between the radiator and the condenser; and
   a first bracket configured to fix the condenser to the radiator and support the shutter, wherein
   the radiator, the condenser, and the shutter are stacked in a front-rear direction,
   the first bracket includes a condenser supporting portion supporting the condenser and a shutter supporting portion supporting the shutter,
   the first bracket having a first side and a second side, the first side and the second side being opposite to each other in a direction perpendicular to the front-rear direction, and
   the condenser supporting portion is located on the first side of the first bracket and the shutter supporting portion is located on the second side of the first bracket.

2. The vehicle radiator assembly according to claim 1, further comprising
   a second bracket, wherein
   the shutter includes a first end and a second end in the direction perpendicular to the front-rear direction,
   the first bracket is configured to support the first end of the shutter, and
   the second bracket is configured to support the second end of the shutter.

3. The vehicle radiator assembly according to claim 2, wherein
   either one of the shutter and the shutter supporting portion of the first bracket includes a first protrusion protruding in the front-rear direction,
   the other one of the shutter and the shutter supporting portion of the first bracket includes a first receiving portion, and
   the first bracket supports the shutter by inserting the first protrusion into the first receiving portion in the front-rear direction.

4. The vehicle radiator assembly according to claim 3, wherein
   the first protrusion has a flat plate shape.

5. The vehicle radiator assembly according to claim 2, wherein
   either one of the shutter and the second bracket includes a second protrusion protruding in the direction perpendicular to the front-rear direction,
   the other one of the shutter and the second bracket includes a second receiving portion, and
   the second bracket supports the shutter by inserting the second protrusion into the second receiving portion in the direction perpendicular to the front-rear direction.

6. The vehicle radiator assembly according to claim 1, wherein
   the radiator is configured to exchange heat between an air and a cooling water,
   the condenser is configured to exchange heat between the air and a refrigerant, and
   the shutter is configured to adjust an amount of air passing through the radiator and the condenser.

7. The vehicle radiator assembly according to claim 1, wherein the first bracket has an L-shape.

8. The vehicle radiator assembly according to claim 1, wherein the direction perpendicular to the front-rear direction is an up-down direction.

* * * * *